3,326,810
DESICCANT PACKAGE
Ronald V. Dolan, Baltimore, and Joseph E. Hofmann, Jessup, Md., assignors to W. R. Grace & Co., New York, N.Y., a corporation of Connecticut
No Drawing. Filed Nov. 16, 1964, Ser. No. 411,626
3 Claims. (Cl. 252—194)

ABSTRACT OF THE DISCLOSURE

A non-dusting silica gel desiccant bag—the bag consisting of silica gel between two sheets bonded together at the edges. Each sheet is made of nylon mesh which has microporous polyurethane bonded to it.

This invention relates to packaged desiccants. In one specific aspect it relates to packaged desiccants which are nondusting.

Packaged desiccants are of a considerable economic importance. They are marketed under various grades and particle sizes. However, in many desiccating applications dust is created by attrition of these desiccant particles and packaging materials.

Desiccant packages which dust are especially troublesome to both industry and the military, as these packages are used to protect delicate electronic devices, missiles, photographic equipment and the like. Desiccant package dusting had become serious enough that the military set up special nondusting specifications. Various types of materials such as paper and cloth bags and sacks, both woven and nonwoven were used in an attempt to contain the desiccant dust and yet not adversely affect the desiccant properties. These attempts failed, for the packages either created dust themselves or did not contain the desiccant dust. In addition, they tore easily and burst upon impact.

It is therefore an object of this invention to overcome the prior art difficulties and to provide a method for packaging desiccants which render them non-dusting.

It is a further object to provide a package for desiccants that are non-dusting, with higher tensile and bursting strength and are non-corrosive.

These and other objects of the invention will become apparent from the following detailed description and specific examples.

Broadly, this invention contemplates encapsulating desiccants in a polyamide reinforced, microporous thermoplastic.

In a preferred embodiment of this invention silica gel is placed on a sheet consisting of a nylon mesh bonded with a microporous polyurethane. A covering sheet of the same material is applied over the silica gel and the top and bottom sheets are bonded together by thermal, chemical, or mechanical sealing of the edges.

The microporous structure of the polyurethane allows vapor transmission through the package, yet is nonpermeable to desiccant dust.

The present discussion will be limited to nylon and polyurethane, but it is to be understood that other materials may be used.

Among those materials that may be used in place of the nylon mesh are other synthetic materials such as Dacron, Orlon, polyethylene, polypropylene and the like. Other microporous thermoplastics such as polystyrene which allow vapor transmission are suitable.

Certain other modified naturally occurring materials may also be used.

The nylon mesh-microporous polyurethane sheet is about 5 to 7 mils thick with the polyurethane component being from about 1 to 2 mils thick. The preferred thickness of the sheet is about 7 mils thick, with the nylon about 5 mils and the polyurethane about 2 mils thick. The pore size of the polyurethane is about 40–60 microns.

The nylon mesh-microporous polyurethane sheet weighs about 3¼ to 4¼ ounces per square yard and has a Mullen strength of about 275 pounds per square inch. It has abrasion resistance as measured by the Tabor abrasion test of 400 cycles, using a CF 10 wheel and a 500 gram load.

The silica gel package of this invention can be reactivated at 245° F. without adverse effect to its encapsulating characteristics.

The invention is illustrated but not limited by the following specific examples.

Example I 25 grams of fine sized silica were placed upon a 7 mil thick sheet of nylon mesh bonded with microporous polyurethane. A covering sheet of the same material was applied on top of the silica gel and a treated die larger than the diameter of the silica gel was pressed upon the sheet. The pressing operation sealed the top sheet with the lower sheet and caused the silica gel to become encapsulated. This package was completely non-dusting with excellent vapor transmission.

Example II

Two hundred and forty-two packages were prepared as described in Example I. These desiccant packages were tested in accordance with military specification MIL–D–3464, "Desiccants, Activated, Bagged, Packaging Use and Static Dehumidification." These tests covered adsorption capacity and rate, dusting characteristics of the package, strength and corrosiveness of the package and the particle size of the silica gel. The results are shown in Table I. Each test result is an average of 121 packages.

TABLE I

| | Mil–D–3464 specification | Test 1 | Test 2 |
|---|---|---|---|
| Unit adsorption capacity: | | | |
| 20% rel. humidity | 2.85 | 2.92 | 3.22 |
| 40% rel. humidity | 5.70 | 5.97 | 6.15 |
| Unit adsorption rate: | | | |
| 40% rel. humidity | .25 | 1.72 | 1.52 |
| 80% rel. humidity | .90 | 3.09 | 2.73 |
| Dusting | At least 8 of 12 bags not to exceed .5 mg. Not more than 2 dust values 60–200 mg. Not more than one dust value over 200 mg. | 0.0 (12 Bags) | 0.0 |
| Strength of bag as received | | | |
| Hot drop test | | Passes | Passes |
| Cold drop test | | Passes | Passes |
| Particle size: | | Passes | Passes |
| Percent retained on ½ inch U.S. sieve | 0.0 Max | 0.0 | None |
| Percent retained on #80 mesh U.S. sieve | 96.0 Min | 99.7 | 99.8 |
| Corrosiveness | | Passes | Passes |
| Unit Content | | 1.0 | 1.0 |

Example III

This test is identical with Example II except that the packages were tested in units of 8, instead of individually. The results are shown in Table II.

TABLE II

| | Mil-D-3464 specification | Test 1 | Test 2 |
|---|---|---|---|
| Unit adsorption capacity: | | | |
| 20% rel. humidity | 2.85 | 3.11 | 3.03 |
| 40% rel. humidity | 5.70 | 6.07 | 6.17 |
| Unit adsorption rate: | | | |
| 40% rel. humidity | .25 | .54 | .50 |
| 80% rel. humidity | .90 | 1.09 | 1.03 |
| Dusting | At least 6 of 12 bags not to exceed 2.5 mg. Not more than 2 dust values 60–200 mg. Not more than one dust value over 200 mg. | 0.0 (12 Bags) | 0.0 |
| Strength of bag as received | | Passes | Passes |
| Hot drop test | | Passes | Passes |
| Cold drop test | | Passes | Passes |
| Particle size: | | | |
| Percent retained on ½ inch U.S. sieve | 0.0 Max | 0.0 | None |
| Percent retained on #80 mesh | 96.0 Min | 100.0 | 100.0 |
| Corrosiveness | | Passes | Passes |
| Unit Content | | 8.0 | 8.0 |

We claim:

1. A method of packaging silica gel which comprises placing said silica gel on a sheet 5 to 7 mils thick consisting of nylon mesh bonded with microporous polyurethane, covering said silica gel with a second sheet of nylon mesh bonded with microporous polyurethane, and sealing the edges of said sheets.

2. The method according to claim 1 wherein said sheets are heat sealed.

3. The product obtained by the process of claim 1.

References Cited

UNITED STATES PATENTS 3,061,475  10/1962  Wallace _____ 117—161
3,085,027  4/1963   Porteous _____ 117—138.8
3,095,315  6/1963   Magill et al. _____ 206—0.5 X LEON D. ROSDOL, *Primary Examiner.*

S. D. SCHWARTZ, *Assistant Examiner.*